US009580013B2

(12) United States Patent
Wierich

(10) Patent No.: US 9,580,013 B2
(45) Date of Patent: Feb. 28, 2017

(54) VEHICLE VISION SYSTEM WITH ASYMMETRIC ANAMORPHIC LENS

(71) Applicant: MAGNA ELECTRONICS INC., Auburn Hills, MI (US)

(72) Inventor: Thomas Wierich, Butzbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 242 days.

(21) Appl. No.: 14/354,675

(22) PCT Filed: Nov. 1, 2012

(86) PCT No.: PCT/US2012/062906
§ 371 (c)(1),
(2) Date: Apr. 28, 2014

(87) PCT Pub. No.: WO2013/067083
PCT Pub. Date: May 10, 2013

(65) Prior Publication Data
US 2014/0293057 A1    Oct. 2, 2014

Related U.S. Application Data

(60) Provisional application No. 61/554,663, filed on Nov. 2, 2011.

(51) Int. Cl.
*H04N 7/18*    (2006.01)
*B60R 1/00*    (2006.01)
(Continued)

(52) U.S. Cl.
CPC ............... *B60R 1/00* (2013.01); *G02B 5/10* (2013.01); *G02B 13/08* (2013.01);
(Continued)

(58) Field of Classification Search
CPC ..... B60R 1/00; B60R 1/08; B60R 2300/8026; B60R 2300/10; B60R 2300/105;
(Continued)

(56) References Cited

U.S. PATENT DOCUMENTS 4,892,403 A  *  1/1990  Merle ................ B29D 11/0073
                                                         156/153
5,343,330 A     8/1994  Hoffman et al.
(Continued)

FOREIGN PATENT DOCUMENTS

WO    WO2012/103193    8/2012
WO    WO2013/016409    1/2013

OTHER PUBLICATIONS

International Search Report and Written Opinion date Jan. 15, 2013 from corresponding PCT Application No. PCT/US2012/062906.

*Primary Examiner* — Jorge L Ortiz Criado
*Assistant Examiner* — Benjamin Pezzner
(74) *Attorney, Agent, or Firm* — Gardner, Linn, Burkhart & Flory, LLP

(57) ABSTRACT

A vision system for a vehicle includes a rear camera disposed at a rear portion of the vehicle and having an exterior field of view rearward of the vehicle. The rear camera includes an imaging array and a lens system for imaging external sources of light at the imaging array. The lens system includes at least one asymmetric anamorphic lens optic. The asymmetric anamorphic lens optic may include a longitudinally truncated conical-shaped lens optic. The longitudinal axis of the longitudinally truncated conical-shaped lens optic may be generally vertical when the rear camera is disposed at the rear portion of the vehicle, with a smaller diameter portion at an upper region of the optic and a larger diameter portion at a lower region of the optic.

16 Claims, 15 Drawing Sheets

(51) Int. Cl.
*G02B 5/10* (2006.01)
*G02B 13/08* (2006.01)
*G06K 9/00* (2006.01)

(52) U.S. Cl.
CPC ...... *G06K 9/00805* (2013.01); *B60R 2300/10* (2013.01); *B60R 2300/105* (2013.01)

(58) Field of Classification Search
CPC ...... G02B 5/10; G02B 13/08; G06K 9/00791; G06K 9/00805
USPC ....... 348/40, 118, 148, 151; 340/425.5, 435, 340/438; 359/205.1; 362/494
See application file for complete search history.

(56) References Cited

U.S. PATENT DOCUMENTS

| | | |
|---|---|---|
| 5,550,677 A | 8/1996 | Schofield et al. |
| 5,570,142 A | 10/1996 | Lieberman |
| 5,670,935 A | 9/1997 | Schofield et al. |
| 5,748,356 A | 5/1998 | Park et al. |
| 5,877,897 A | 3/1999 | Schofield et al. |
| 6,007,223 A | 12/1999 | Futami |
| 6,201,642 B1 | 3/2001 | Bos |
| 6,396,397 B1 | 5/2002 | Bos et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 7,038,577 B2 | 5/2006 | Pawlicki et al. |
| 7,561,181 B2 | 7/2009 | Schofield et al. |
| 7,720,580 B2 | 5/2010 | Higgins-Luthman |
| 7,733,409 B2 | 6/2010 | Fleury et al. |
| 7,929,221 B2 | 4/2011 | Ning |
| 7,940,469 B2 | 5/2011 | Kamei |
| 8,698,894 B2 | 4/2014 | Briggance |
| 2002/0118464 A1 | 8/2002 | Nishioka et al. |
| 2003/0107785 A1 | 6/2003 | Takeyama et al. |
| 2008/0198226 A1* | 8/2008 | Imamura ............ G06K 9/00805 348/148 |
| 2009/0141363 A1 | 6/2009 | Shin et al. |
| 2010/0079874 A1* | 4/2010 | Kamei ................. G02B 13/06 359/668 |
| 2014/0211009 A1 | 7/2014 | Fursich |

* cited by examiner

VEHICLE VISION SYSTEM WITH ASYMMETRIC ANAMORPHIC LENS

CROSS REFERENCE TO RELATED APPLICATIONS

The present application is a 371 national phase filing of PCT Application No. PCT/US2012/062906, filed Nov. 1, 2012, which claims the filing benefit of U.S. provisional application, Ser. No. 61/554,663, filed Nov. 2, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, such as rearwardly of the vehicle and optionally such as sidewardly and/or forwardly of the vehicle, with the camera having a lens that focuses images at an imaging array or imaging plane of the camera. The lens or lens assembly comprises a lens or lens optic or lens system that focuses images or that images external light with reduced distortion at the imaging plane of the imaging array or sensor of the camera, and reduces or limits imaging of areas that are of less interest or of less relevance, such as areas above the vehicle such as the sky or the like.

To achieve this, the lens system has a position dependent projection ratio. A special case of such a lens system is the projection behavior of an asymmetric anamorphic lens or lens system. Such an asymmetric anamorphic lens system has a linear magnification dependency into one dimension. The camera provides communication/data signals, including camera data or image data that are processed and may detect objects or vehicles or light sources or the like responsive to such image processing. In one form, the asymmetric lens or lens optic may comprise at least one longitudinally truncated conical-shaped lens optic. The longitudinal axis of the longitudinally truncated conical-shaped lens optic may be generally vertical when the rear camera is disposed at the rear portion of the vehicle.

These and other objects, advantages, purposes and features of the present invention will become apparent upon review of the following specification in conjunction with the drawings.

DESCRIPTION OF THE PREFERRED EMBODIMENTS

Figure 1:
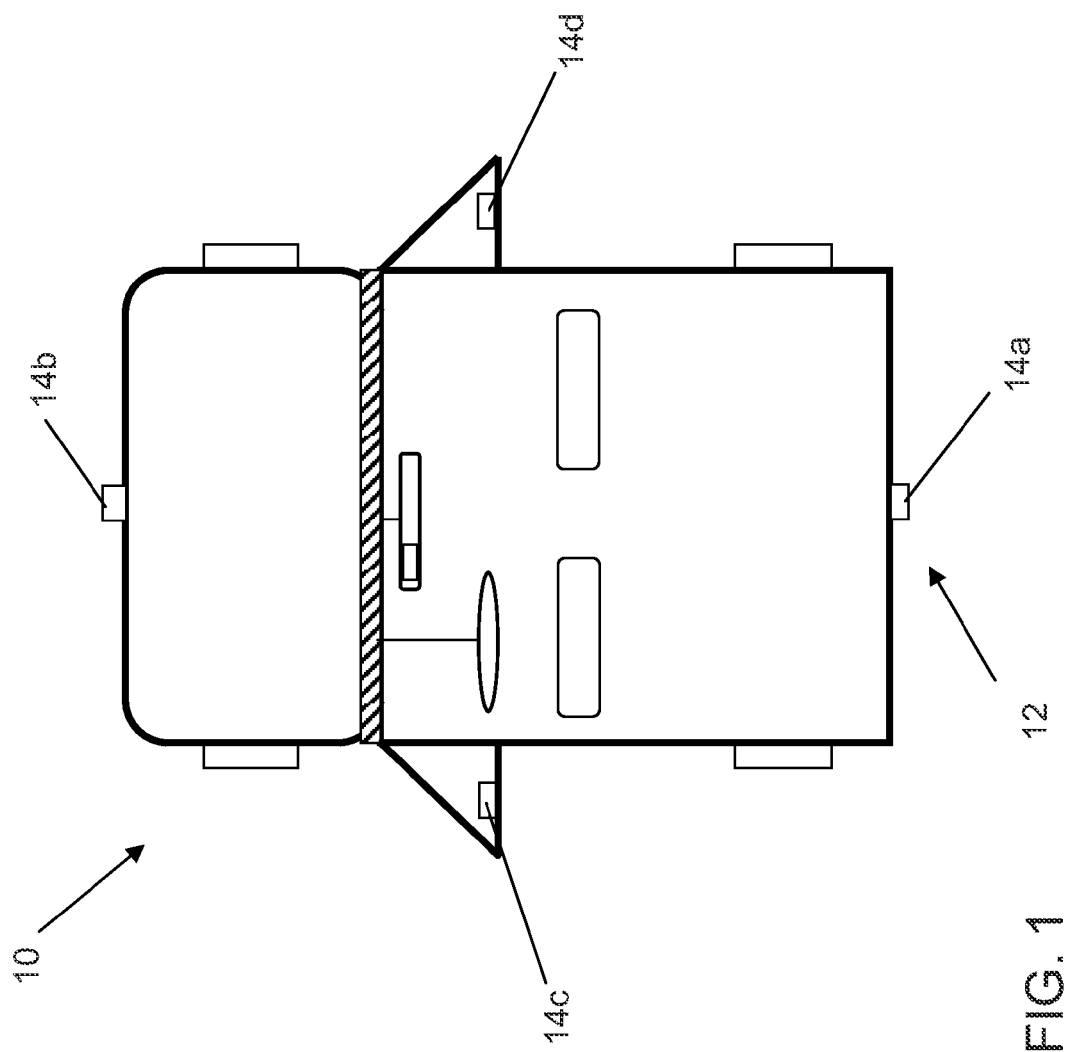
FIG. 1 is a plan view of a vehicle with a vision system and imaging sensor or camera that provides an exterior field of view in accordance with the present invention.
Figure 17:
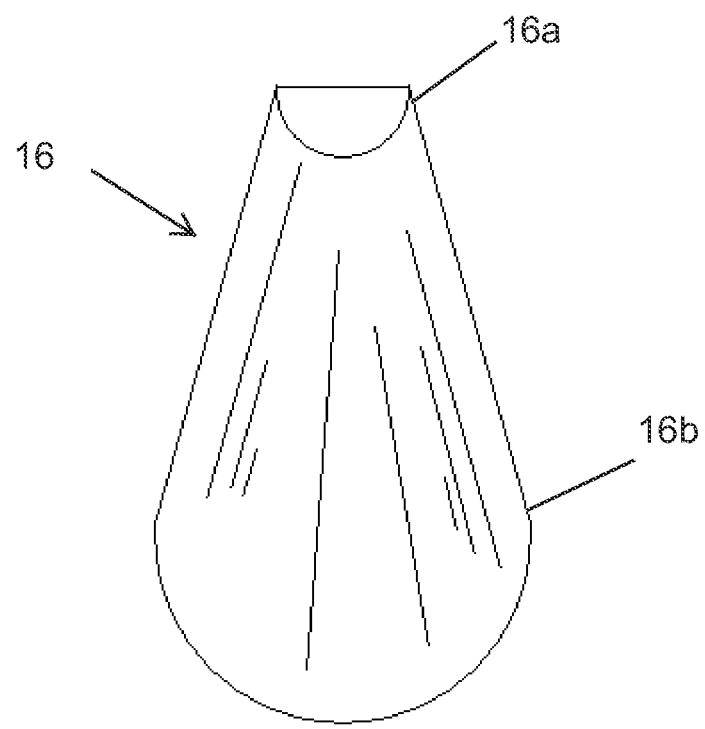
FIG. 17 is a schematic of an asymmetric anamorphic lens of the present invention.

Referring now to the drawings and the illustrative embodiments depicted therein, a vehicle 10 includes an imaging system or vision system 12 that includes at least one imaging sensor or camera (such as a rearward facing imaging sensor or camera 14a and/or optionally such as a forwardly facing camera 14b at the front (or at the windshield) of the vehicle, and/or a rearwardly and/or sidewardly facing camera 14c, 14b at the sides of the vehicle), which captures images exterior of the vehicle, with the camera or camera having a lens 16 (FIG. 17) for focusing images at or onto an imaging array or imaging plane of the camera (FIG. 1). The vision system 12 is operable to process image data captured by at least one camera (such as, for example, the rearwardly facing camera 14a) to detect objects, such as objects to the rear of the subject or equipped vehicle during a reversing maneuver, or such as approaching or following vehicles or vehicles at a side lane adjacent to the subject or equipped vehicle or the like. The camera optic comprises a lens system with position dependent magnification. A special case example of such a lens system is the projection behavior of an asymmetric anamorphic lens or lens system or lens optic (such as, for example, a longitudinally truncated conical-shaped lens optic 16 such as shown in FIG. 17). This has a linear projection ratio dependency into one dimension. This case will become discussed as executable example below but the scope of the present invention is not limited to that case. The asymmetric anamorphic lens that substantially reduces distortion in the captured images and crops the captured images so that image data representative of the area of interest exterior the vehicle is captured, while not capturing images of other areas, such as the sky or the like, as discussed below.

Use of anamorphic lenses, which is a type of symmetric aspherical lenses or cylindrical lenses, is known, such as described in U.S. Pat. Nos. 7,733,409; 5,748,356; 5,570,142; and/or 6,007,223, and/or in U.S. Publication Nos. US2009-0141363; US2004-0179099; and/or US2010-0079874, which are hereby incorporated herein by reference in their entireties. For example, it is known to equip a vehicle vision system with an anamorphic optical lens for having an image stretched from a fisheye view (such as a view provided by a wide angle spherical fish-eye lens or lens optic) to a size or dimensional ratio that generally corresponds to the camera or sensor chip shape or format. Further image enhancements may be done electronically via image processing of the image data by an image processor or the like. Use of such anamorphic lenses and/or asymmetric lenses has been proposed, such as in U.S. Publications Nos. US2011-0279813; US2003-0107785; and/or US2002-0118464, which are hereby incorporated herein by reference in their entireties. Such anamorphic lenses stretch the images that are imaged or focused by the lenses, such as known in the cinematography and optical arts.

Multi-camera vehicle vision systems are often equipped with wide angle cameras with wide angle fields of view of up to about 200 degrees or thereabouts. such multi-camera vehicle vision systems, as conventionally known, often display, on a video display screen in the interior cabin of the vehicle and visible to the driver, a panoramic and/or bird's eye/top down view video image formed as a composite image from image data/images captured by individual cameras of the plurality of cameras in the multi-camera vehicle vision system, such as by utilizing aspects of the systems described in U.S. Pat. Nos. 5,550,677; 5,670,935; 5,760,962; 5,877,897; 6,222,447; 6,396,397; 6,498,620; 6,201,642; 6,690,268; 6,717,610; 6,891,563; 7,859,565; 6,636,258; 7,720,580; 7,038,577; 7,561,181; 8,066,415; and/or 8,262,268, and/or PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012 and published Nov. 1, 2012 as International Publication No. WO 2012/145822, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; and/or Ser. No. 61/559,970, filed Nov. 15, 2011, which are all hereby incorporated herein by reference in their entireties.

Figure 2:
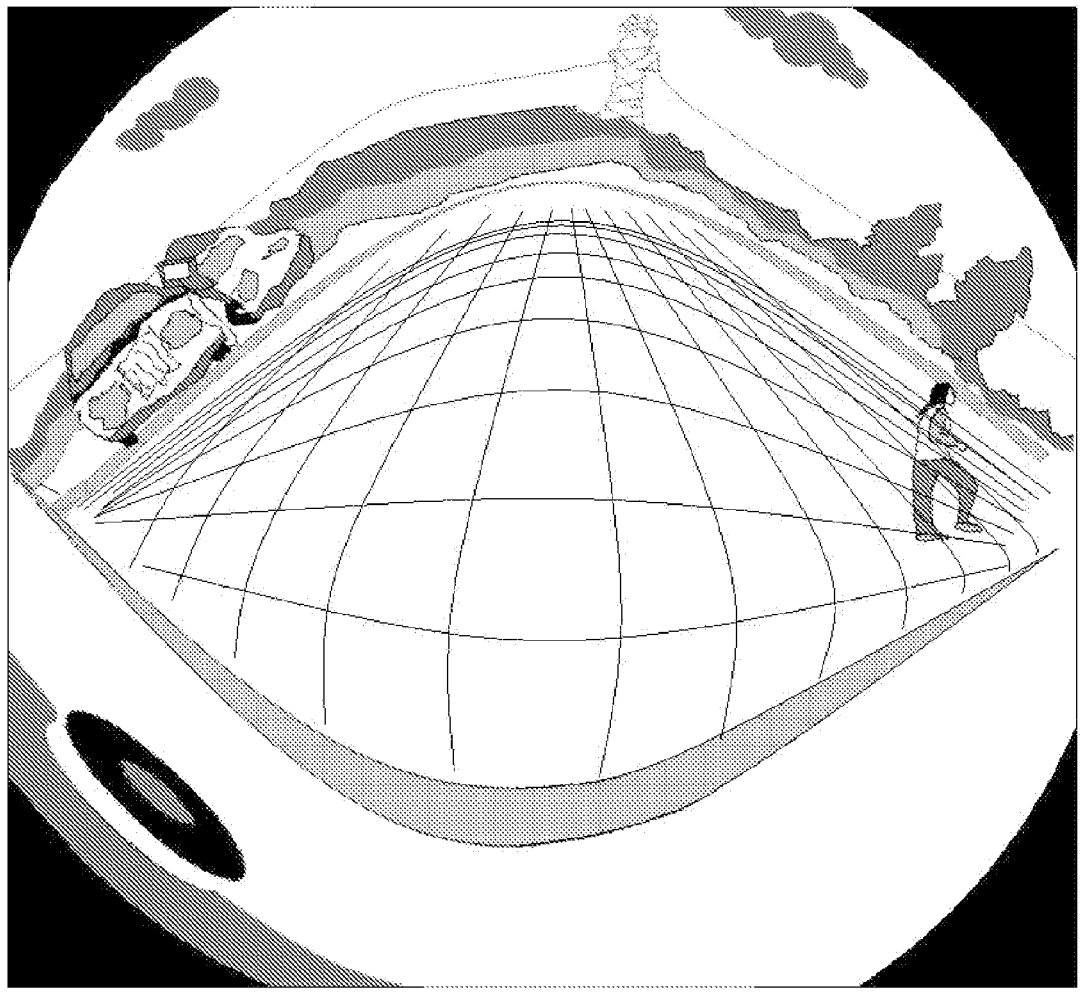
FIG. 2 is a schematic of a fish eye view of an automotive vision camera with a scenery grid.
Figure 3:
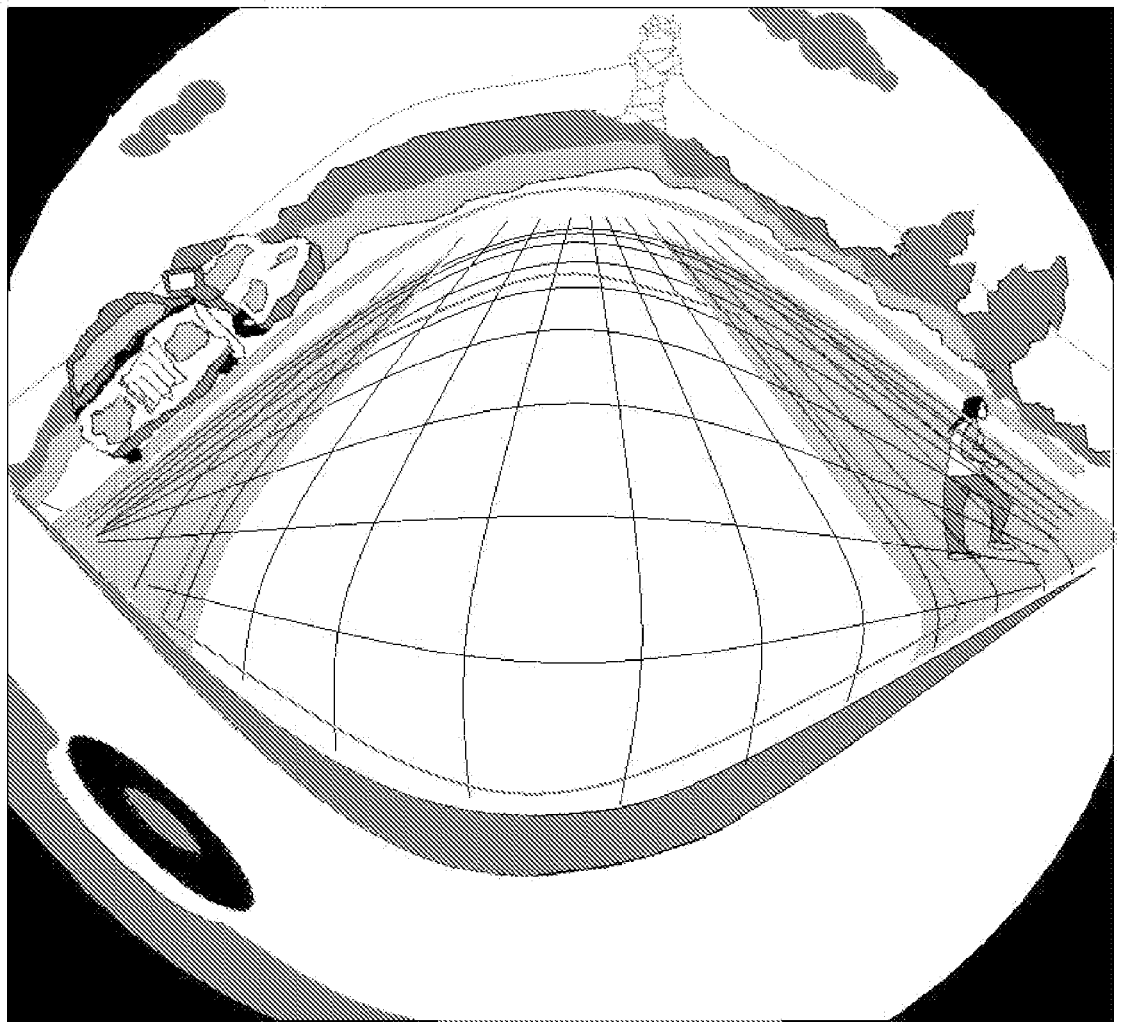
FIG. 3 is a schematic of a fish eye view of a camera with two selected areas of interest on both sides highlighted in gray for enhanced processing of images, such as for generating a cross traffic view.

Such wide angle fields of view provide a fish eye view, where the images captured by a camera using such a wide angle lens have a generally round shape with substantial distortion, such as can be seen in the schematic of FIG. 2 and the image captured by a fish eye camera in FIG. 6. Camera chips or imaging arrays are rectangles or generally squared, often with a 4:3 width-to-height ratio. Thus, when a fish eye lens is used and the fish eye image is focused or projected onto a 4:3 imaging array (or other ratio array), there are un-illuminated areas or spots in the corners and the pixels of the imaging array at those corners are unused.

The quality of a captured image as captured by a pixelated imaging array is typically expressed by the pixel count of the imaging array. The fisheye image's nature is that the projected scenery appears quite close in its center while at the sides the projection ratio is quite small. This means in the center there are much more pixels per (identical sized) region in nature involved than at the sides. In order to enhance the quality or rating, the amount or number of pixels that are used in capturing an image per square dimension should be as high as possible. One approach to increase the pixel count is to have smaller pixels or a larger imaging array or chip, but both of these approaches results in increasing the cost of the camera. Smaller pixels come with another disadvantage of having less amount of light on each pixel, so the amplification has to be increased, which leads to a higher noise level.

For processing vision system camera images or captured image data, typically areas get selected (see FIGS. 3, 5, 6 and 8) to be displayed in a natural way for the human eye or for machine vision. This may be done via an algorithm running on a processor or microprocessor or processing unit, whereby such processing consumes part of the processor's processing capacity.

Figure 15:
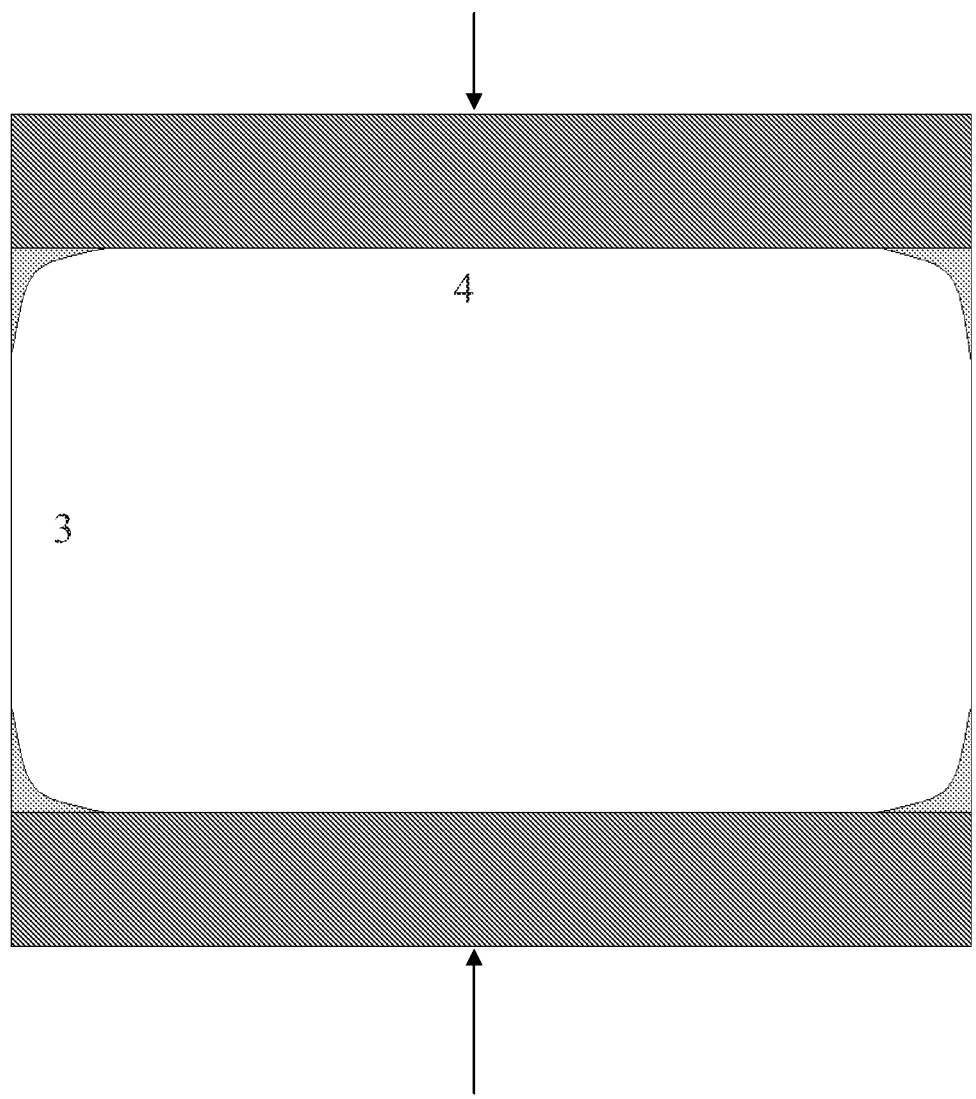
FIG. 15 is a schematic of images adapted into a 4:3 image ratio, for fitting to the camera chip ratio.

Optionally, optics such asymmetric anamorphic lenses may be used to (at least in part) adapt the image into a 4:3 image ratio for fitting the image to the camera chip dimensions/ratio, with a reduction of losses in the corners as well (such as shown in FIG. 15). However, and as shown in FIG. 2, there is substantial distortion in the images.

The present invention provides a lens for a camera of a vehicle vision system that allows for reduced processing of the image to display the image in a substantially non-distorted manner an a 4:3 imaging array of a camera. Although discussed as having a 4:3 imaging array, clearly other ratio imaging arrays may be utilized, such as, for example, a 2.3:1 ratio or a 16:9 ratio or the like, while remaining within the spirit and scope of the present invention. Instead of increasing the chip size or the number of pixels, the present invention aspires to use the full chip size and so aspires that substantially all of the pixels are used and the pixels detect just the parts of areas of the image that are of interest to get processed in a vehicle vision system and the other parts are not detected (and are not focused onto the imaging array). Additionally, dewarping, destoring, deskewing and/or de-perspective image manipulation operations may be at least partially executed optically instead of electronically, which eases and accelerates the calculation operations and adds to accuracy and or visual quality. The parts or regions or areas of the exterior scene within the field of view of the camera that are always or nearly always uninteresting or less relevant to the vehicle vision system and/or the driver of the vehicle include the sky or region above the horizon and/or above the vehicle, and often areas or regions at or near the bottom of the vehicle itself. The scenery or regions of interest typically have a generally horizontal shape. Areas of interest are these portions of an image which may become used in certain view compositions as like in a cross traffic view in which both horizontal sides of a vehicle front camera fish eye view may be cut and put side by side and mostly deskewed to be presented to the drivers display. This view may aid during exiting an area with narrow walls which hinder the driver's view sideward of the vehicle, while the front portion, and the front camera 14b (FIG. 1), is already out of the walls' coverage.

Figure 5:
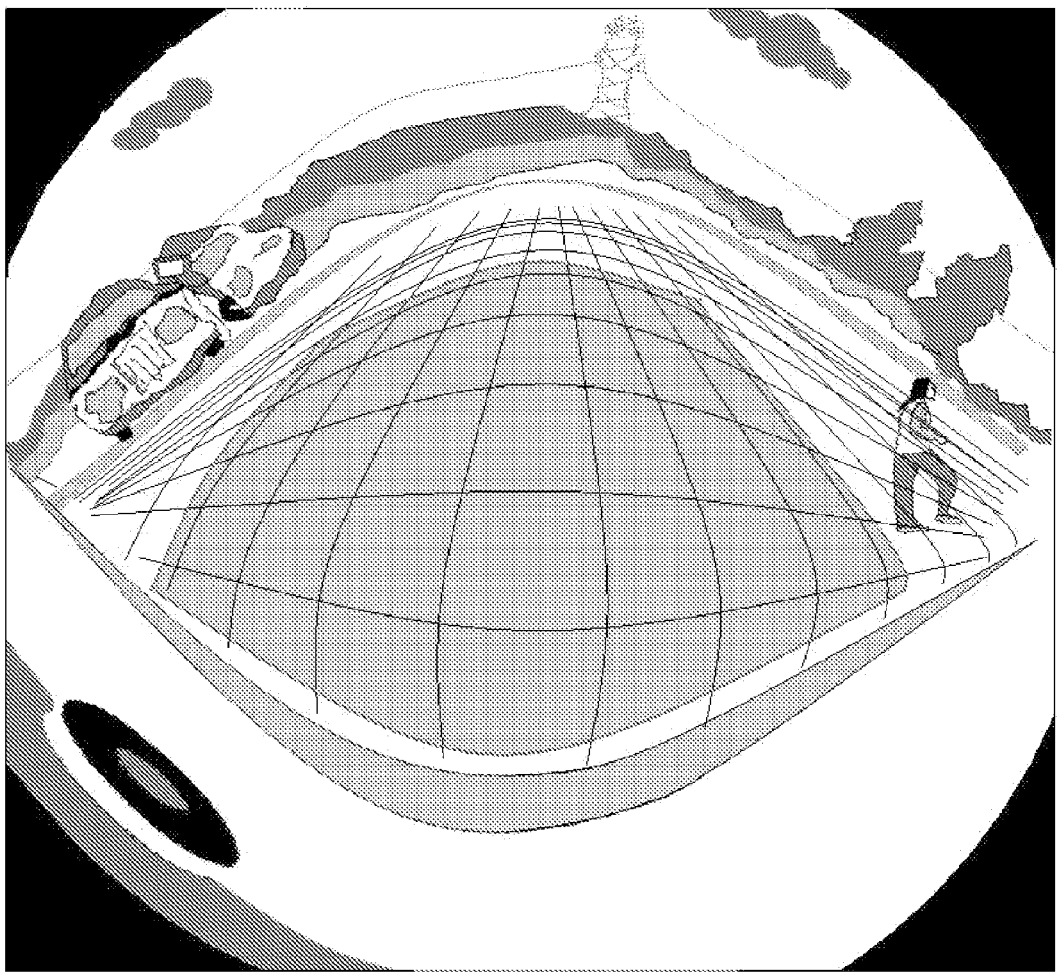
FIG. 5 is a schematic of a fish eye view of a camera with a selected area of interest in the center highlighted in gray, such as for generating a surround view image by enhanced processing of images or by optical means in accordance with the present invention.
Figure 6A:
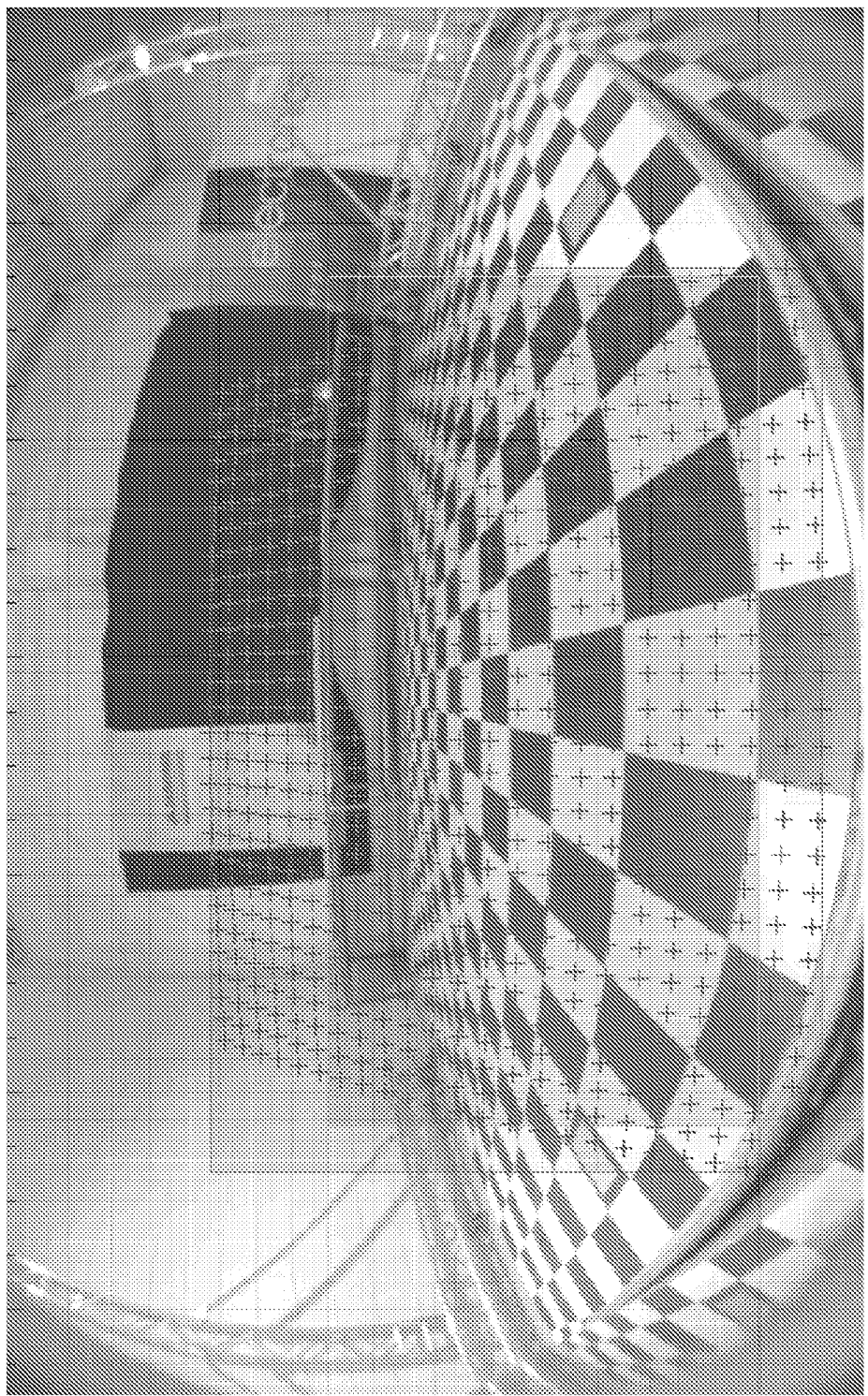
FIG. 6A is a view captured by a fish eye camera, with an area of interest in the center highlighted by crosses, such as for generating a surround view image.
Figure 6B:
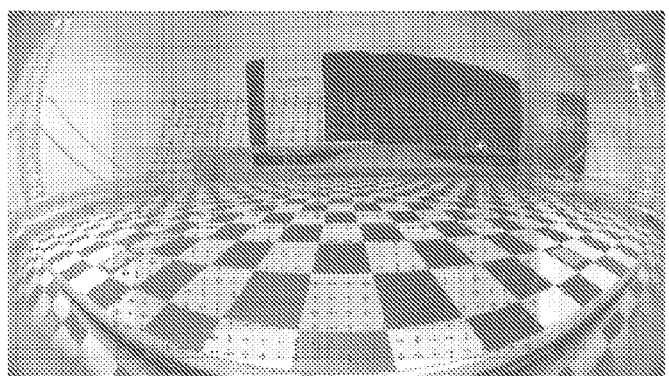
FIG. 6B is identical to FIG. 6A but shrunk in size for better comparison.
Figure 6C:
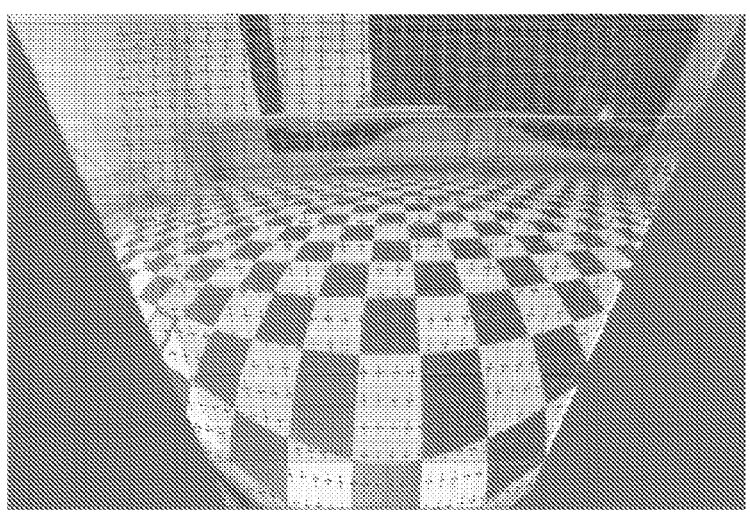
FIG. 6C is a cut out area of interest of the fish eye image of FIG. 6A, and increasingly compressed to the bottom end, whereby the fish eye characteristic of the source image is still present, but the virtual viewpoint has risen.
Figure 6D:
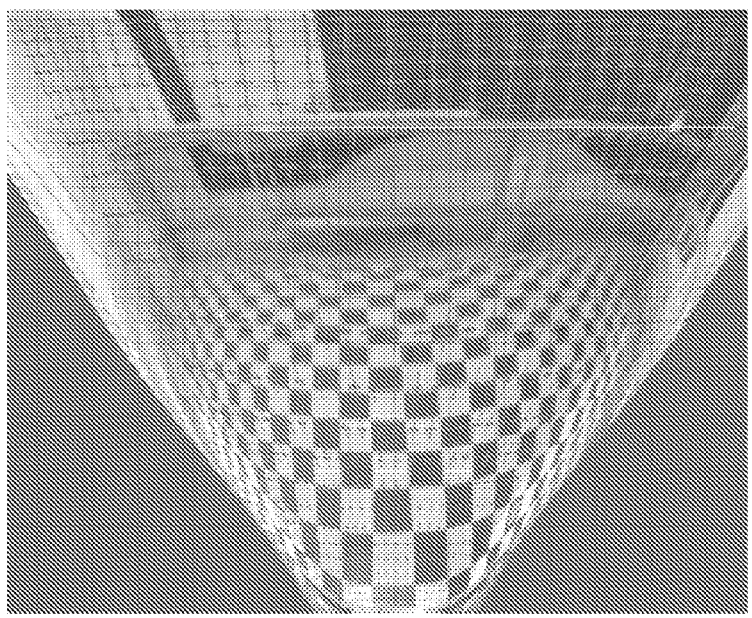
FIG. 6D is the image of FIG. 6A punched in at the center to result a de-fish eye effect, shown with the vertical lines in the center being mostly parallel and the vertical just slightly bent, with the center of the image being comparable to the desired images scheme in FIG. 11.
Figure 7:
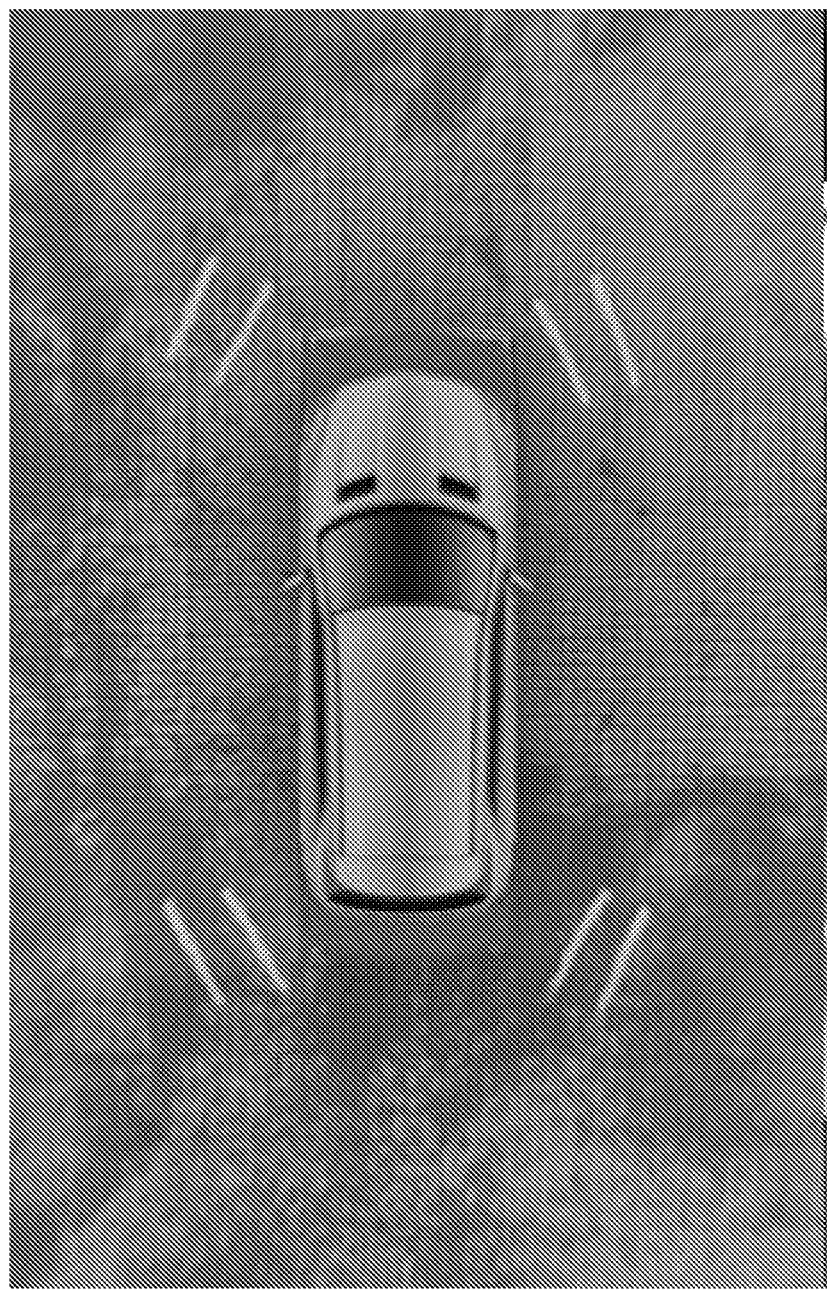
FIG. 7 is a surround view image stitched by four areas of interest cut out of four vehicle vision system's fish eye views at the center of each view and deskewed by enhanced image processing to generate a virtual view as like vertical from top down, shown with additional overlays (a vehicle) established at the center.
Figure 8:
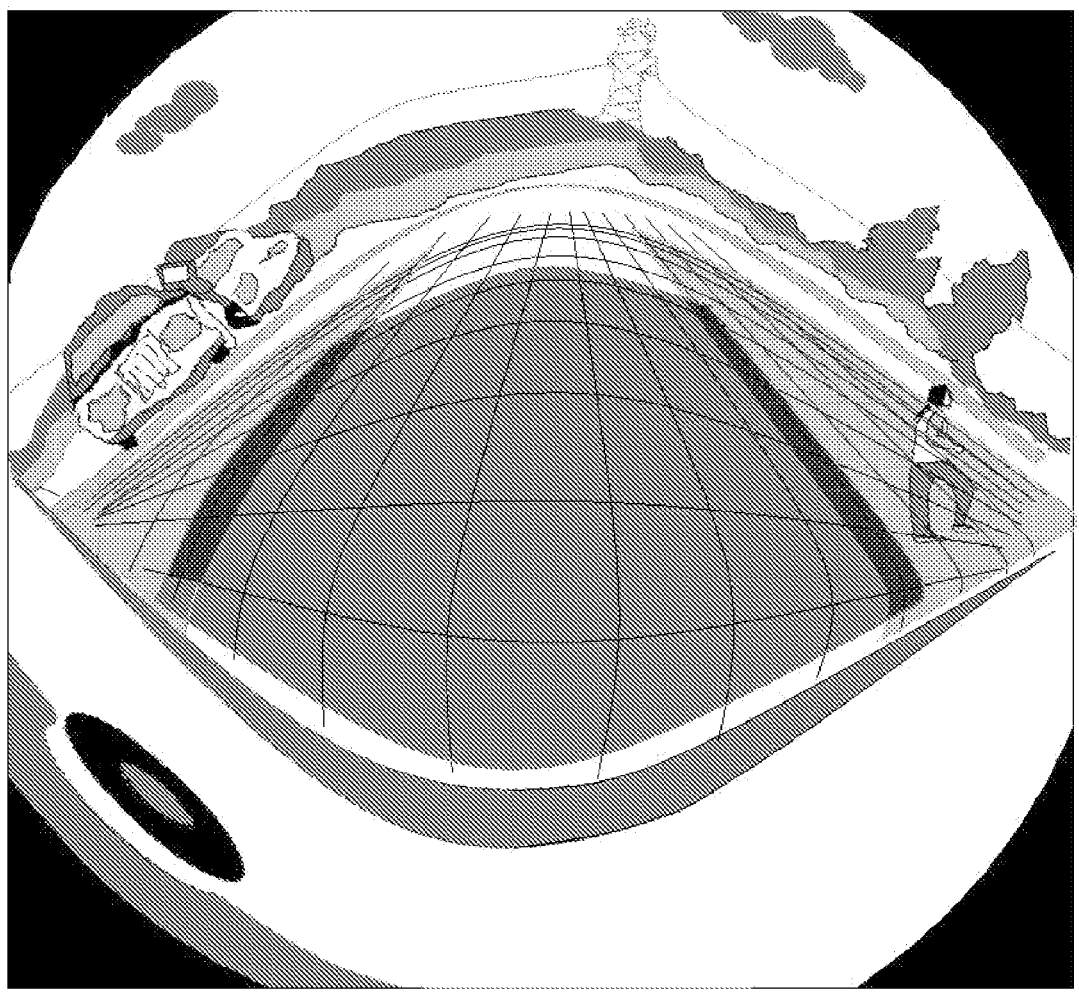
FIG. 8 is a schematic of a fish eye view of a camera with multiple areas of interest selected highlighted in gray.
Figure 9:
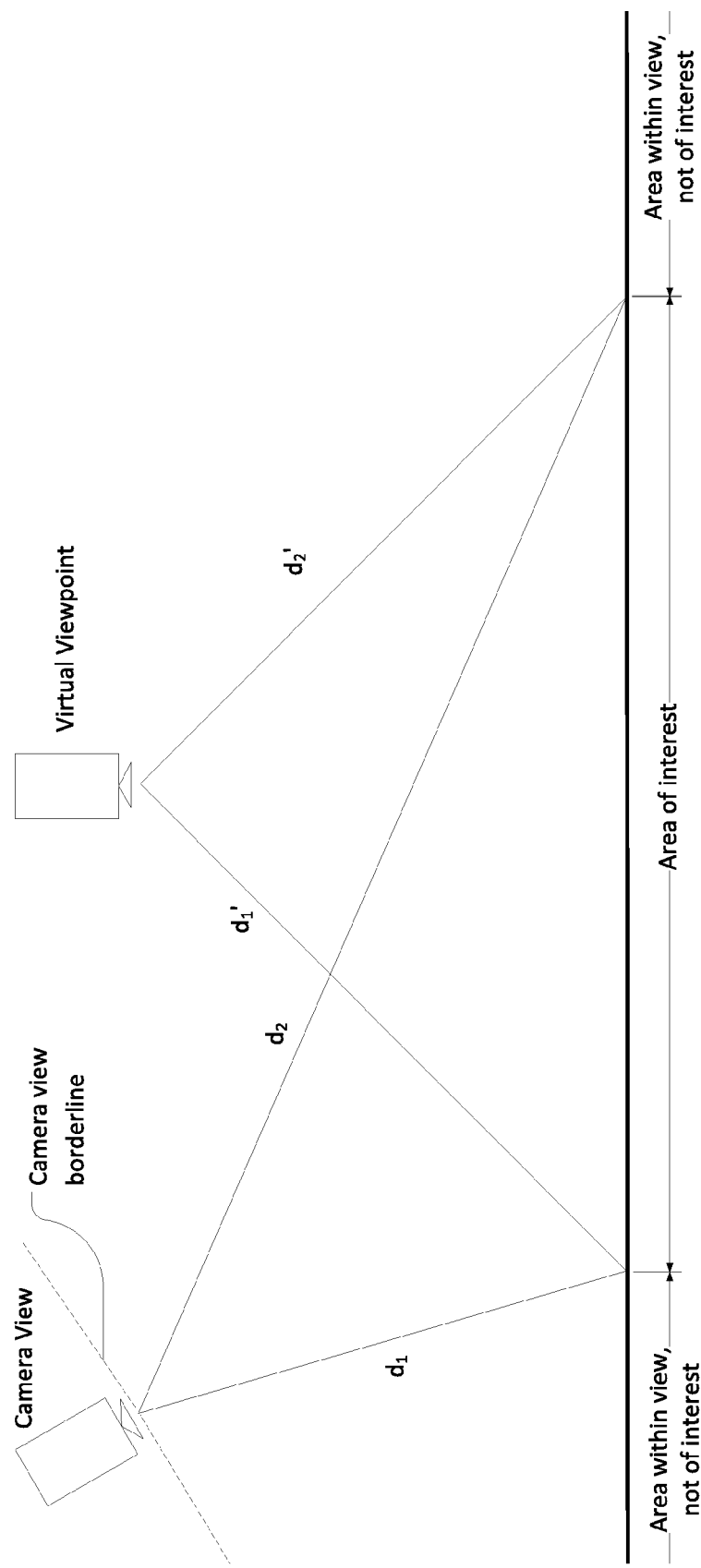
FIG. 9 is a (one dimensional) schematic showing a typical view point, angle and viewing area of a vehicle vision fish eye camera onto a viewing area of interest (such as for displaying a vehicle vision surround view image as like shown in FIG. 7 and similar to the selected area shown in gray in FIG. 5 and by crosses in FIG. 6) and a virtual viewpoint which is essentially on top of the viewing area of interest (from the camera's viewpoint the close borderline of the area of interest is in a short distance $d^1$, during the far borderline is in a far distance $d_2$, and from the virtual top viewpoint the distances $d_1'$ and $d_2'$ to both borderlines of the same viewing area of interest are substantially similar or almost identical)

Another example is a surround view image (see FIG. 7), where the close centers of all four fish eye cameras 14a, 14b, 14c and 14d (FIG. 1) may be selected (see selected area in gray of FIGS. 3, 5, 6 and 8), cut out, and deskewed from a perspective view into a top view, which means compressing the area (of interest) close to the vehicle (compare $d_1$ to $d_1'$ and $d_2$ and $d_2$ to $d_2'$ and $d_1'$ to $d_2'$ in FIG. 9) and expanding the farther areas so that the dimensions in the near areas take essentially the same space as dimensions in the farther distant areas (compare FIGS. 6B and 6C—the image of FIG. 6C is the cut out area of interest of fish eye image of FIG. 6A, which was increasingly compressed vertically to the bottom end. The viewpoint has virtually risen by that).

$$d_1 < d_2 \tag{1}$$

$$d_1' = d_2' \tag{2}$$

There is another component from the fish eye curvature character which may have to be compensated by electronically (dewarping) within the enhanced processing system as well according to the mapping to the projections plane bowl shape according PCT Application No. PCT/US2012/ 048110, filed Jul. 25, 2012 and published Jan. 31, 2013 as International Publication No. WO 2013/016409, which is hereby incorporated herein by reference in its entirety. By that parallel lines on the ground become projected in parallel (In the example of FIG. 6D the image of FIG. 6C was punched in at the center so the fish eye character was widely eliminated at the center region, which may become used in a top view or surround view stitching similar to FIG. 7).

Figure 10:
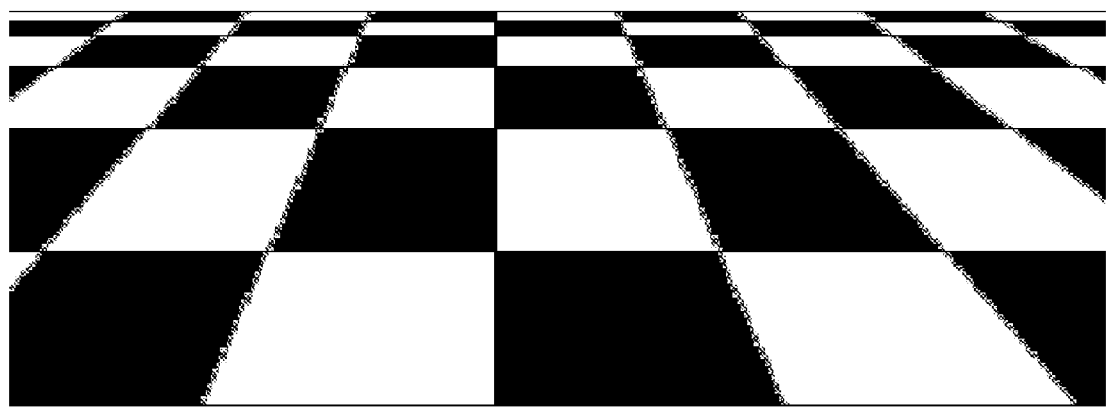
FIG. 10 is a schematic of a normal (non fish eye) perspective view onto an area of interest similar to the selected area shown in gray in FIG. 5 and by crosses in FIG. 6.
Figure 11:
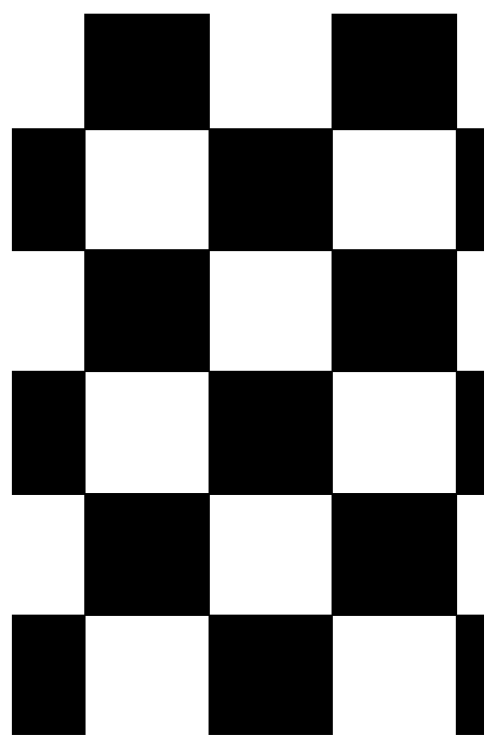
FIG. 11 is a schematic of a (deskewed) top view of the a source area as like shown in FIG. 10 either generated by enhanced image processing or by optical means in accordance with the present invention or both in combination.

FIG. 10 shows a schematic of a normal (non fish eye) perspective view onto an area of interest similar to the selected area shown in gray in FIG. 5 and by crosses in FIG. 6A. Assuming the black and white surfaces are rectangles as like at a chess board, these appear bigger in the perspective foreground than at the background. The foreground is more to the bottom of the image than the background. That means when trying to transfer the image of FIG. 10 to that of FIG. 11 (corresponds to turning the camera view into the virtual view in FIG. 9), the lower portion of the image has to become compressed while the upper portion of the image has to become expanded. There is a dependency of a spot's position to the rate it becomes stretched/compressed (magnified).

$$fv = f_0(h, w);$$

$$f_h = f_0(h, w) \tag{3}$$

Legend:
fv=stretching factor (to the vertical)
$f_0$=nominal stretching factor (to the vertical)
h=actual spot's height
h=height of the whole image
w=actual spot's width In the case of equation (3), there is a linear dependency of a spot's height to the rate it becomes stretched/compressed (magnified).

$$fv = f_0 * h/hi \tag{4}$$

The present invention provides a lens system that has a position dependent projection ratio. For doing fully or partial de-perspective deskewing, a lens system that has a height dependent projection ratio of the vertical stretching is suggested as special case. As like used for generating virtual top views out of vertical views. Such lens system is the projection behavior is given by asymmetric anamorphic lens or lens system (such as a lens assembly having one or more lens optics with at least one of the lens optics comprising an asymmetric anamorphic lens element). These have a linear projection ratio dependency into one dimension.

For example, the asymmetric anamorphic lens may comprise a shape of a longitudinally truncated or half cut frustum or a truncated or half cut cone (where the cone or conical shape is cut in half longitudinally, such as shown in FIG. 17). When the vision system is implemented at a vehicle and the camera is mounted at or disposed at, for example, a rear portion of the vehicle so as to have a generally rearward field of view (such as for capturing rearward images for use in a backup assist system or rear vision system or the like), the longitudinally truncated conical shaped asymmetric anamorphic lens optic may be arranged at the imaging array with its longitudinal axis generally vertically oriented when the vehicle is disposed at a generally horizontal support surface or road. As shown in FIG. 17, the lens optic 16 may have a smaller diameter or cross dimension at the upper end or region 16a of the lens optic and a larger diameter or cross dimension at the lower end or region 16b of the lens optic. The asymmetric anamorphic lens functions to stretch the edges of the images captured by the imaging array and camera while limiting capturing of images or image data in areas above and below the regions of interest rearward of the vehicle (or forward or sideward if the camera is mounted at the vehicle with a forward or sideward field of view). By so orienting the lens or lens system, with the larger diameter end closer to the likes of the rear bumper/fender of the vehicle, the overall lens system gathers a less distorted view of the entire equipped vehicle width in general, and of the equipped vehicle rear bumper/fender in particular.

Figure 16:
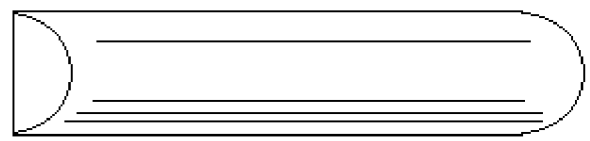
FIG. 16 is a schematic of a known symmetric anamorphic lens.

In comparison, a symmetric anamorphic lens (such as shown in FIG. 16) may buckle a stripe across the whole image which may find use or adapt an image vertically for fitting or focusing to a 4:3 ratio imaging array or for projecting more space of areas of interest.

During stretching, captured images electronically does not add to use data content the stretching of projection size of an area of interest onto the imager optically does increase the amount of use pixels.

This effect substantially reduces the processing capacity of the image system's deskewing algorithm, such that the vision system may utilize or incorporate a less powerful processor, which reduces the system's costs, while enhancing image quality, so the resolution of the areas or regions of interest is substantially increased or enhanced. Such benefits provide a vision system that is more capable of detecting objects and performing other tasks. By using such an asymmetric anamorphic lens within the camera optics of the camera or sensor, the optical effects shown in FIG. 6C may be achieved (optically instead of electronically) and additionally the farther distant scenery may be stretched so the nearer areas are de-zoomed in a way that results in substantially all of the horizontal lines in the exterior scene appear horizontal in the captured images and substantially all of the vertical lines in the exterior scene appear vertical in the captured images.

To reduce the number of different cameras provided by or purchased by a vehicle manufacturer when equipping vehicles and vehicle platforms with multi-camera vision systems, the asymmetric anamorphic lens or lens system of the present invention may be provided as a variable item or optional item, which could be selected and plugged into or attached at a given camera, depending on the particular application of any given camera. Thus, the asymmetric anamorphic lens or lens system may be selected depending on an installation height and/or viewing angle and especially depending on the desired area or areas of interest which may be the main subject of optical optimization and/or the like of the vehicle camera. While major distortions may be done by the optics, minor distortions may be done by the processing system.

Figure 4:
FIG. 4 is an example of a cross traffic view system, with both areas of interest being cut out of a fish eye view camera at the sides and partially dewarped and distorted (deskewed) by enhanced image processing.
Figure 4:
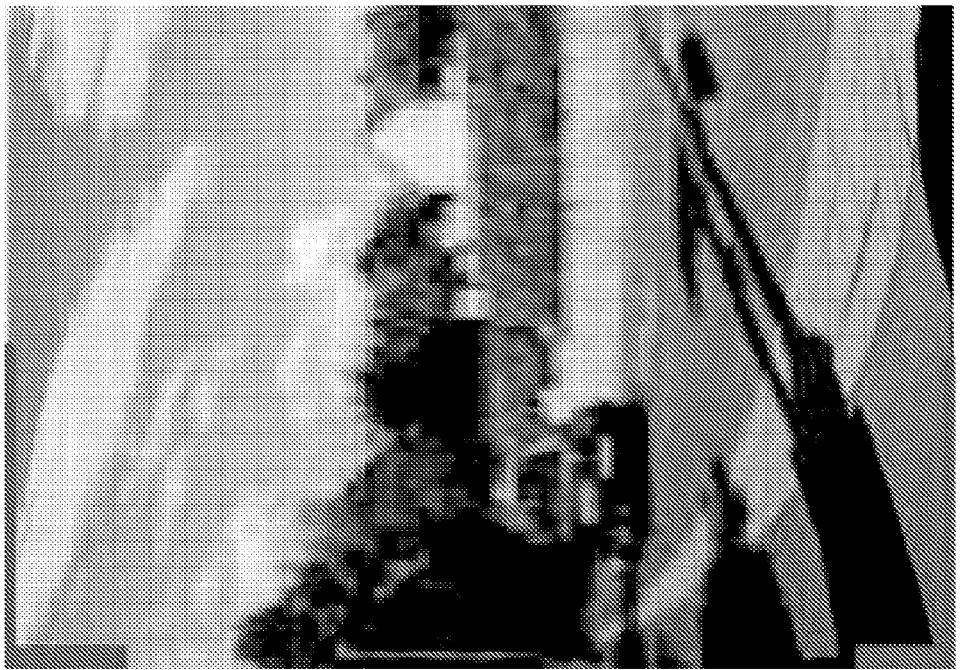
Figure 12:
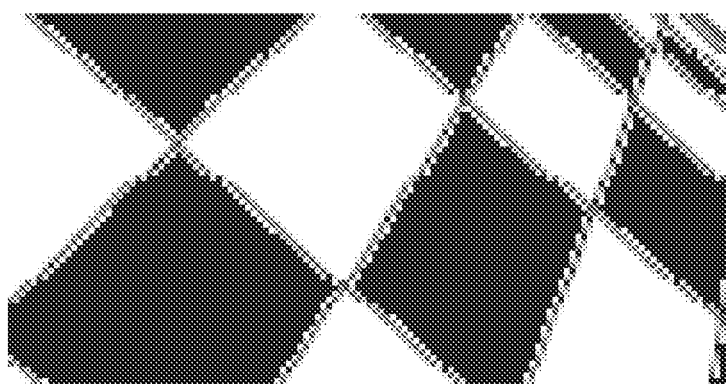
FIG. 12 is a schematic of a close up perspective view onto an area of interest similar to the selected area shown in gray in FIG. 3.
Figure 13:
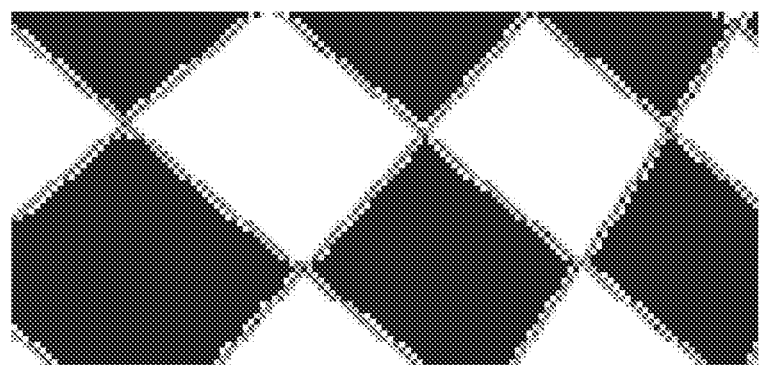
FIG. 13 is a schematic of a close up view onto the similar area as like shown in FIG. 12 which was partially deskewed by enhanced image processing or by optical means in accordance with the present invention or both in combination to improve the perceptibility of the far edge.
Figure 14:
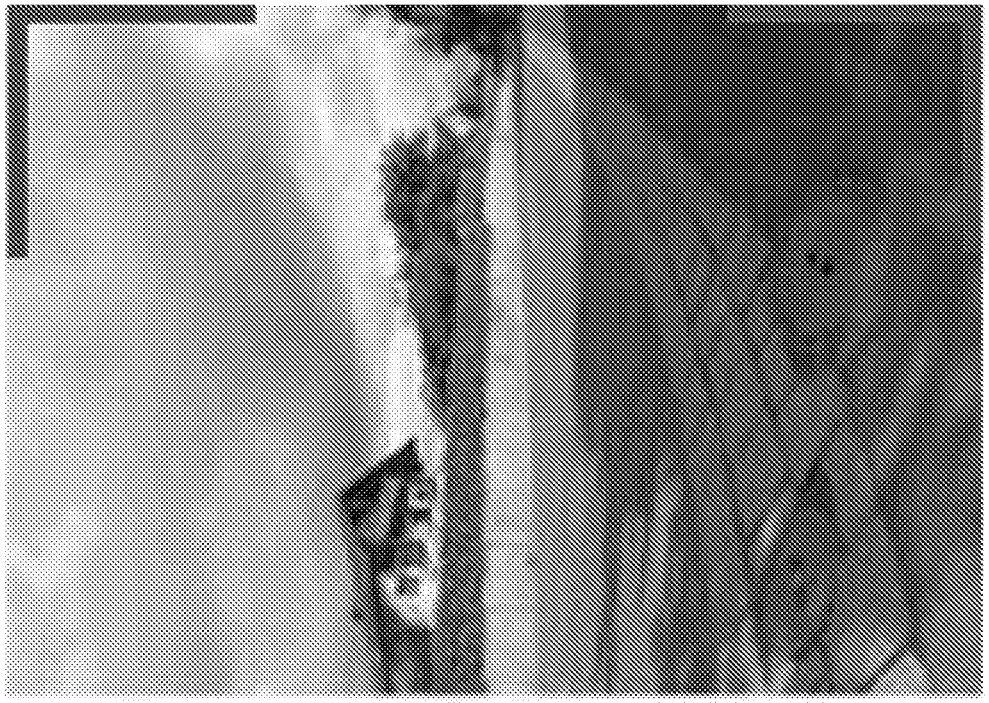
FIG. 14 is a partially deskewed area of interest of the images of FIG. 3 for better perception produced by enhanced image processing or by optical means in accordance with the present invention.
Figure 14:
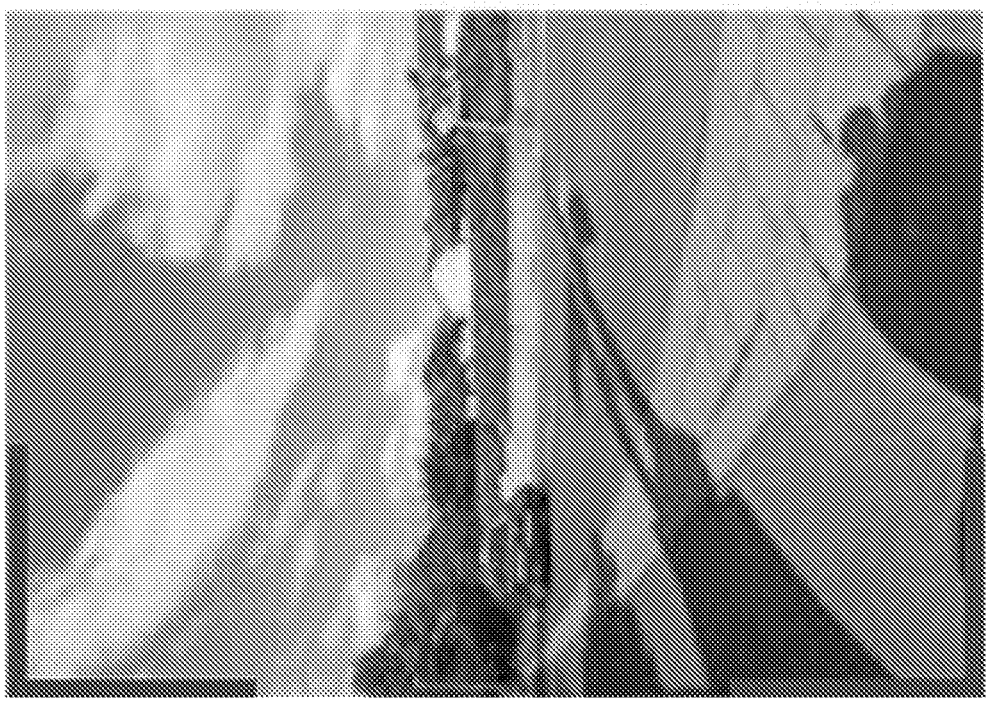

When aspiring to optimize the pixel count on multiple areas of interest by using an asymmetrical anamorphic lens system of the present invention, there may be a best compromise for all areas by using one asymmetrical anamorphic lens system or there may be several asymmetrical anamorphic lens systems for optimizing different areas of interest. The example of FIG. 14, which was generated by a deskewing the image of FIG. 4 electronically, may be produced optically instead by having at least two asymmetrical anamorphic lens systems in place. These may be optimized to de-perspective the far sides of the fish eye view as like shown in FIG. 13 (which may be an area of interest similar to the grayed area shown in FIG. 3). This is the resulting schematic when deperspectiving the schematic scene of FIG. 12. Another asymmetrical anamorphic lens system may be used in addition and optimized in combination to the others to de-perspective the center for being used in a top view.

These lens systems may be comprised in one lens, in a stacked lens comprising one asymmetrical anamorphic lens system, in several single asymmetrical anamorphic lenses comprising a multi area of interest optimized system or comprising an array like lens system or as multi lens system using miniature lenses applied on top of single pixels or small groups of pixels.

The asymmetrical anamorphic lens system may be at the front, the middle or at the end of the camera optic. The asymmetrical anamorphic lens or lenses may be made out of glass or plastic.

In a preferred embodiment, the vision system may include a rear camera disposed at a rearward portion of a vehicle and having an exterior field of view rearward of the vehicle. The rear camera preferably comprises a rear backup camera that views at least the rearmost portion of the equipped vehicle (typically a rear fender or bumper of the equipped vehicle) and that views further rearward and sideward into the rear blind zone rearward of the vehicle. The rear camera includes an imaging array and a lens or lens system, with the lens system having at least one asymmetrical anamorphic lens optic. The asymmetrical anamorphic lens optic may comprise a longitudinally truncated conical-shaped lens optic (see, for example, FIG. 17) that has its longitudinal axis oriented generally vertically when the camera is mounted at or disposed at the vehicle. An image processor processes image data captured by the imaging array (such as to detect objects rearward of the vehicle and such as for detecting objects during a reversing maneuver of the vehicle), such as for a rear vision system or backup assist system or the like (such as for a system utilizing aspects of the vision systems described in U.S. Pat. Nos. 5,760,962; 5,877,897; 6,222, 447; 5,949,331; 6,396,397; 6,498,620; 6,201,642; 6,690, 268; 6,717,610; 6,891,563; 7,859,565; 5,550,677; 5,670, 935; 6,636,258; 7,720,580; 7,038,577; 7,561,181; 8,066, 415; and/or 8,262,268, which are all hereby incorporated herein by reference in their entireties).

Optionally, the rearward facing camera may be part of a multi-camera vision system having a forward facing camera (disposed at a forward portion of the vehicle and having an exterior field of view forward of the vehicle) and/or sideward facing cameras (disposed at a side portion or region of the vehicle and having an exterior field of view generally sidewardly of the vehicle). The asymmetrical anamorphic lens optics of the cameras function to provide captured images that are stretched at the edges to provide the desired wide angle field of view and that do not include information or image data in areas of the exterior scene (such as the sky or the ground immediately adjacent or below the vehicle) that are less relevant or less important to the function of the vision system (such as object detection during a reversing maneuver of the vehicle or object detection during parking of the vehicle or the like).

When driving a vehicle that is equipped with a conventional wide view fisheye lens system, the driver of the vehicle may be presented, on the video display screen that he/she is viewing in the cabin of the vehicle, with a distorted image that includes a distorted view of the rear fender/bumper of the equipped vehicle as well as a distorted view of the rearward scene captured by the rear backup camera. The rear backup camera is typically generally centrally located at the rear of the vehicle, such as at a rear license plate or rear logo of the vehicle (such as described in U.S. patent application Ser. No. 11/672,070, filed Feb. 7, 2007, now U.S. Pat. No. 8,698,894, which is hereby incorporated herein by reference in its entirety), and thus is proximate to or at the rear fender/bumper itself. Thus, it is a challenge for the rear camera to capture image data that includes the leftmost and rightmost regions at the equipped vehicle while simultaneously capturing image data immediately to the rear of the vehicle and further rearward and downfield from the vehicle. Although conventional fisheye lenses having the likes of about a 130 degree field of view to about a 180 degree field of view are known, and although it is conventionally known to use electronic distortion reduction techniques to reduce or mitigate the optically induced distortion inherent in such conventional fisheye lens systems, it remains a challenge to deliver for view on the video screen an at least substantially undistorted rear image that includes the full width of the rear or back of the vehicle as well as the full width of the rear blind zone existing behind the equipped vehicle.

Use of an asymmetric lens as described herein and in accordance with the present invention significantly overcomes such challenges and helps deliver a full vehicle-width undistorted backup rear vision image where the driver can readily view objects and persons present in the full dimensions of the rear blind zone. The asymmetric anamorphic lens of the present invention is also of particular utility to assist tow hitch connection of a trailer to the vehicle during the reversing of the vehicle to the trailer tow hitch (such as by utilizing aspects of the vision systems described in U.S. Pat. No. 7,005,974 and/or PCT Application No. PCT/US2012/022517, filed Jan. 25, 2012 and published Aug. 2, 2012 as International Publication No. WO 2012/103193, which are hereby incorporated herein by reference in their entireties), and also is similarly useful for front facing cameras mounted generally centrally at the front of the vehicle for front parking assist and/or cross traffic detection and/or the like. Moreover, the asymmetric anamorphic lens of the present invention is useful for at least some and preferably all of the plurality of individual cameras (typically four) used in multi-camera systems.

Therefore, the present invention provides a vehicle vision system having a camera with an exterior field of view and comprising a pixelated imaging array and a lens with a wide angle field of view (such as a rearward facing camera having an exterior field of view rearward of the vehicle). The lens may comprise a plurality of lens optics or optical elements arranged along an optical path, with at least one lens optic comprising an asymmetric anamorphic lens or lens optic. The lens focuses images or images light representative of the exterior scene within the wide angle field of view of the lens and camera onto the imaging array of the camera and in a substantially non-distorted manner and without inclusion of less relevant areas (such as the sky) in the images captured by the camera. Thus, the lens provides enhanced imaging with reduced distortion and with reduced processing needed to establish a substantially reduced distortion image (for display and/or processing) with the desired or appropriate dimensional ratio (such as a 4:3 width-to-height ratio or 2.3:1 ratio or 16:9 ratio or the like).

The imaging sensor or camera that captures the image data for image processing may comprise any suitable camera or sensing device, such as, for example, an array of a plurality of photosensor elements arranged in at least 640 columns and at least 480 rows (at least a 640×480 imaging array), with a respective lens focusing images onto respective portions of the array. Preferably, the photosensor array comprises a mega-pixel array having at least one million pixels. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012 and published Feb. 7, 2013 as International Publication No. WO 2013/019707, and/or PCT Application No. PCT/US2012/048110, filed Jul. 25, 2012 and published Jan. 31, 2013 as International Publication No. WO 2013/016409, and/or PCT Application No. PCT/CA2012/000378, filed Apr. 25, 2012 and published Nov. 1, 2012 as International Publication No. WO 2012/145822, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012 and published Apr. 4, 2013 as International Publication No. WO 2013/048994, and/or U.S. patent applications, Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-0002873, and/or U.S. provisional applications, Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/563,965, filed Nov. 28, 2011; Ser. No. 61/559,970, filed Nov. 15, 2011; Ser. No. 61/556,556, filed Nov. 7, 2011; Ser. No. 61/554,663, filed Nov. 2, 2011; Ser. No. 61/552,167, filed Oct. 27, 2011; Ser. No. 61/550,664, filed Oct. 24, 2011, which are all hereby incorporated herein by reference in their entireties. The system may communicate with other communication systems via any suitable means, such as by utilizing aspects of the systems described in PCT Application No. PCT/US10/

038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The vision system may integrate the front and rear cameras, such as by utilizing aspects of the vision systems described in U.S. provisional applications, Ser. No. 61/682,486, filed Aug. 13, 2012; and Ser. No. 61/648,744, filed May 18, 2012, which are hereby incorporated herein by reference in their entireties. The image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009 and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. No. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012 and published Nov. 1, 2012 as International Publication No. WO 2012/145822, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; and/or Ser. No. 61/559,970, filed Nov. 15, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:

a rear camera disposed at a rear portion of a vehicle and having an exterior field of view rearward of the vehicle, wherein said rear camera is operable to capture image data;

wherein said rear camera comprises a two dimensional imaging array of photosensing pixels;

wherein said rear camera comprises a lens system for imaging external sources of light at said imaging array;

wherein said lens system comprises at least one asymmetric anamorphic lens optic;

wherein said at least one asymmetric anamorphic lens optic comprises at least one truncated frustoconical lens optic;

wherein said truncated frustoconical lens optic comprises an upper region and a lower region, the upper region having a smaller cross dimension than the lower region, and a longitudinal axis spanning the upper region and the lower region;

wherein said truncated frustoconical lens optic is truncated about the longitudinal axis creating a single flat facet spanning the upper and lower regions of the truncated frustoconical lens optic;

wherein said longitudinal axis is vertically oriented with respect to a horizontal surface on which the vehicle is disposed; and an image processor operable to process image data captured by said rear camera, wherein said image processor is operable to detect objects rearward of the vehicle during a reversing maneuver of the vehicle.

2. The vision system of claim 1, wherein said lens system comprises the ability to have a height dependent magnification component into the horizontal direction.

3. The vision system of claim 1, wherein said at least one truncated frustoconical lens optic comprises a plurality of lens optics.

4. The vision system of claim 3, wherein said plurality of lens optics comprises a stack of multiple lens optics.

5. The vision system of claim 4, wherein said stack of multiple lens optics is glued by an adhesive having a refractive index that is similar to the refractive index of the lens optic material.

6. The vision system of claim 1, wherein said truncated frustoconical lens optic comprises a glass lens optic.

7. The vision system of claim 1, wherein said truncated frustoconical lens optic comprises a plastic lens optic.

8. The vision system of claim 1, wherein said lens system comprises the ability to have several direction dependent magnification components, and wherein said magnification components act orthogonal to one another.

9. The vision system of claim 1, wherein said vision system comprises a multi-camera vision system.

10. The vision system of claim 9, comprising a forward camera disposed at a forward portion of the vehicle and having an exterior field of view forward of the vehicle, wherein said forward camera comprises an imaging array and a lens system comprising at least one asymmetric anamorphic lens optic, and wherein said image processor is operable to process image data captured by said forward camera.

11. The vision system of claim 10, comprising a side camera disposed at each side of the vehicle and having a respective exterior field of view sideward of the vehicle, wherein each of said side cameras comprises an imaging array and a lens system comprising at least one asymmetric anamorphic lens optic, and wherein said image processor is operable to process image data captured by said side cameras.

12. The vision system of claim 11, comprising a display operable to display images representative of image data captured by said rear camera, said forward camera and said side cameras.

13. The vision system of claim 1, comprising a display operable to display images representative of image data captured by said rear camera.

14. A vision system for a vehicle, said vision system comprising:
a rear camera disposed at a rear portion of a vehicle and having an exterior field of view rearward of the vehicle, wherein said rear camera is operable to capture image data;
wherein said rear camera comprises a two dimensional imaging array of photosensing pixels;
wherein said rear camera comprises a lens system for imaging external sources of light at said imaging array;
wherein said lens system comprises at least one asymmetric anamorphic lens optic and wherein said at least one asymmetric anamorphic lens optic comprises at least one truncated frustoconical lens optic;
wherein said truncated frustoconical lens optic comprises an upper region and a lower region, the upper region having a smaller cross dimension than the lower region, and a longitudinal axis spanning the upper region and the lower region;
wherein said truncated frustoconical lens optic is truncated about the longitudinal axis creating a single flat facet spanning the upper and lower regions of the truncated frustoconical lens optic;
wherein said longitudinal axis is vertically oriented with respect to a horizontal surface on which the vehicle is disposed;
an image processor operable to process image data captured by said rear camera, wherein said image processor is operable to detect objects rearward of the vehicle during a reversing maneuver of the vehicle; and
a display operable to display images representative of image data captured by said rear camera.

15. The vision system of claim 14, wherein said at least one truncated frustoconical lens optic comprises a plurality of lens optics, and wherein said lens optics are glued by an adhesive having a refractive index that is similar to the refractive index of the material of said lens optics.

16. A vision system for a vehicle, said vision system comprising:
a front camera disposed at a forward portion of a vehicle and having an exterior field of view forward of the vehicle, wherein said front camera is operable to capture image data, and wherein said front camera comprises a two dimensional imaging array of photosensing pixels;
a side camera disposed at each side of the vehicle and having a respective exterior field of view sideward of the vehicle, wherein each of said side cameras comprises an imaging array and a lens system comprising at least one asymmetric anamorphic lens optic, and wherein said image processor is operable to process image data captured by said side cameras;
a rear camera disposed at a rear portion of a vehicle and having an exterior field of view rearward of the vehicle, wherein said rear camera is operable to capture image data, and wherein said rear camera comprises a two dimensional imaging array of photosensing pixels;
wherein said rear camera comprises a lens system for imaging external sources of light at said imaging array;
wherein said lens system comprises at least one asymmetric anamorphic lens optic and wherein said at least one asymmetric anamorphic lens optic comprises at least one truncated frustoconical lens optic;
wherein said truncated frustoconical lens optic comprises an upper region and a lower region, the upper region having a smaller cross dimension than the lower region, and a longitudinal axis spanning the upper region and the lower region;
wherein said truncated frustoconical lens optic is truncated about the longitudinal axis creating a single flat facet spanning the upper and lower regions of the truncated frustoconical lens optic;
wherein said longitudinal axis is vertically oriented with respect to a horizontal surface on which the vehicle is disposed;

an image processor operable to process image data captured by said rear camera, wherein said image processor is operable to detect objects rearward of the vehicle during a reversing maneuver of the vehicle; and
a display operable to display images representative of image data captured by said rear camera.

* * * * *